(12) United States Patent
Wong

(10) Patent No.: US 8,046,745 B2
(45) Date of Patent: Oct. 25, 2011

(54) METHOD TO EXAMINE THE EXECUTION AND PERFORMANCE OF PARALLEL THREADS IN PARALLEL PROGRAMMING

(75) Inventor: Peter W. Y. Wong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1364 days.

(21) Appl. No.: 11/565,079

(22) Filed: Nov. 30, 2006

(65) Prior Publication Data

US 2008/0134150 A1  Jun. 5, 2008

(51) Int. Cl.
*G06F 9/45* (2006.01)
(52) U.S. Cl. ...................................................... 717/130
(58) Field of Classification Search ................... 717/130
See application file for complete search history.

(56) References Cited

U.S. PATENT DOCUMENTS

| | | | |
|---|---|---|---|
| 6,341,371 B1 | 1/2002 | Tanddri | |
| 7,065,634 B2 * | 6/2006 | Lewis et al. | 712/227 |
| 7,603,664 B2 * | 10/2009 | Dutt et al. | 717/153 |
| 2004/0199919 A1 | 10/2004 | Tovinkere | |
| 2005/0144602 A1 | 6/2005 | Ngai | |
| 2005/0198627 A1 | 9/2005 | Du | |
| 2005/0283756 A1 * | 12/2005 | O'Dwyer | 717/109 |
| 2006/0225078 A1 * | 10/2006 | Anderson | 718/104 |
| 2011/0010715 A1 * | 1/2011 | Papakipos et al. | 718/100 |

\* cited by examiner

*Primary Examiner* — John Chavis
(74) *Attorney, Agent, or Firm* — Cantor Colburn LLP; Steven Bennett

(57) ABSTRACT

The present invention relates to compiler generated code for parallelized code segments, wherein the generated code is used to determine if an expected number of parallel processing threads is created for a parallel processing application, in addition to determining the performance impact of using parallel threads of execution. In the event the expected number of parallel threads is not generated, notices and alerts are generated to report the thread creation problem. Further, a method is disclosed for the collection of performance metrics for N threads of execution and one thread of execution, and thereafter performing a comparison operation upon the execution threads. Notices and alerts are generated to report the resultant performance metrics for the N threads of execution versus the one thread of execution.

20 Claims, 4 Drawing Sheets

```
pragma omp parallel for for (j=0; j<M j++)

a [j]  =  b [j] +scalar*c [j];

OpenMP Code Segment
```

*FIG. 4*

United States Patent US 8,046,745 B2

METHOD TO EXAMINE THE EXECUTION AND PERFORMANCE OF PARALLEL THREADS IN PARALLEL PROGRAMMING

BACKGROUND OF THE INVENTION

1. Field of the Invention

This invention relates to methods for assessing parallel programming solutions, and particularly to the diagnostic examination of the execution and performance of parallel threads of execution that are implemented within a parallel computing environment.

2. Description of Background

Before out invention, conventionally, parallel computing systems (e.g., symmetric multiprocessing (SMP) systems) were used to effectively divide a task into smaller sub-tasks on multiple processors in order to efficiently balance the processing workload of the task; the results of the task division including decreased task processing times, and the faster acquisition of computational results. The dividing of the task into sub-tasks effectively created parallel processes, or threads, wherein the parallel processes/threads were simultaneously executed upon multiple computing resources of a system.

To optimize the use of parallel computing systems, parallel programming models have been developed. Particularly, parallel programming is focused on the separation, or partitioning of projects into separate tasks, in addition to the allocation of the tasks to different processors. Communication between multiple task processes traditionally has been facilitated by way of communications programming protocol models that are directed to distributed memory systems (e.g., by the use of Message Passing Interface (MPI)), or shared memory multiprocessing systems (e.g., by the use of OpenMP).

In many instances, when a communications programming protocol model is implemented to set forth instructions for accomplishing a predetermined parallel processing task, the programmed instructions may not completely be performed. For example, in the event that the processing for a segment of code is specified to perform a loop operation, the predetermined number of loops is evenly distributed among the same number of execution threads. The reasoning behind distributing the looping function among the differing processing threads is to utilize multiple resources within a system, and thus diminish the computational processing time. However, there may be occurrences when not all of the prescribed loop execution threads are running, and the computation processing time is not optimized. In these instances, the occurrence could be due to various reasons (e.g., problems due to a kernel or compiler, user error, defects in an SMP library, etc. . . . ).

Therefore, a need exists for an automated diagnostic performance technique that can be used to determine whether a parallelized code segment is fully executed as prescribed within a parallel programming environment, and further to provide performance estimates of specific parallelized code segments throughout an entire program.

SUMMARY OF THE INVENTION

The shortcomings of the prior art are overcome and additional advantages are provided through the provision of a method for the examination of the execution and performance of parallel threads in a parallel computing system, the method comprising the steps of acquiring source code of a parallel processing application for compilation within a computing system, selecting at least one parallelized code segment from the source code for processing, wherein the parallelized code comprises a loop segment, and generating additional code for the parallelized code segments, the added code segment comprising N threads and one thread of execution, wherein N represents the number of parallel threads of execution at run time into which the parallelized code segment is partitioned.

The method further provides the steps of determining if the expected number of N threads of execution have been generated, transmitting a warning in the event that the expected number of N threads of execution have not been generated identifying a starting index value and a completion index value of the loop, identifying a primary sub-loop of the loop, wherein the primary sub-loop comprises the N threads of execution, and generating a warning to the computing system operator in the event that the primary sub-loop cannot be identified, and thereafter completing the execution of the loop and the processing of the application.

Yet further, the method provides the steps of identifying a secondary sub-loop for the loop, wherein the secondary sub-loop comprises the one thread of execution, generating a warning in the event that the secondary sub-loop cannot be identified, and thereafter completing the execution of the loop and the processing of the application, completing the remaining iterations of the loop, determining the performance metrics of the N threads of execution, determining the performance metrics of the one thread of execution, comparing the performance metrics of the one thread of execution with that of the N threads of execution, and reporting the performance ratio of N threads of execution versus the one thread of execution.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can determine whether programmed code segments have been executed as instructed, in addition to determining the performance impact of the programmed code segments with parallel threads.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 4 illustrates one example of an OpenMP code segment.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

It is conventionally known that compilers are computer programs, or sets of programs, that are used to translate a computer language (i.e., source code) into a target language (i.e., an object code). Traditionally, source code is translated in order to create an executable program file. As such, compilers perform a plethora of operational functions (e.g., lexical analysis, parsing, pre-processing, semantic analysis, code generation, etc. . . . ).

Within aspects of the present invention, a compiler is utilized to generate a series of additional code for code segments that have been allocated for parallel processing operations. Generally, upon encountering a parallelized code segment, the compiler will generate the additional code for N threads of execution, and one thread of execution, wherein N is the number of execution threads determined at run time for parallel processing. Within aspects of the present invention, a determination is made as to whether the appropriate number of execution threads (i.e., N threads of execution) has been generated.

In the event that the determined number of N execution threads has not been created, then a system alert warning is generated and transmitted to a computing system application developer or administrator, the warning providing details in regard to the code generating discrepancy. Further, the performance impact of the N execution threads are determined by comparing the performance metrics of the one execution thread against those of the N execution threads. In the event there is no noticeable performance gain in the performance of the N execution threads over the one execution thread, or there is a marked degradation in the performance of the N execution threads, then a warning is generated and transmitted to the computing system application developer or administrator specifying that corrective actions to resolve the performance issues should be initiated.

Figure 1:
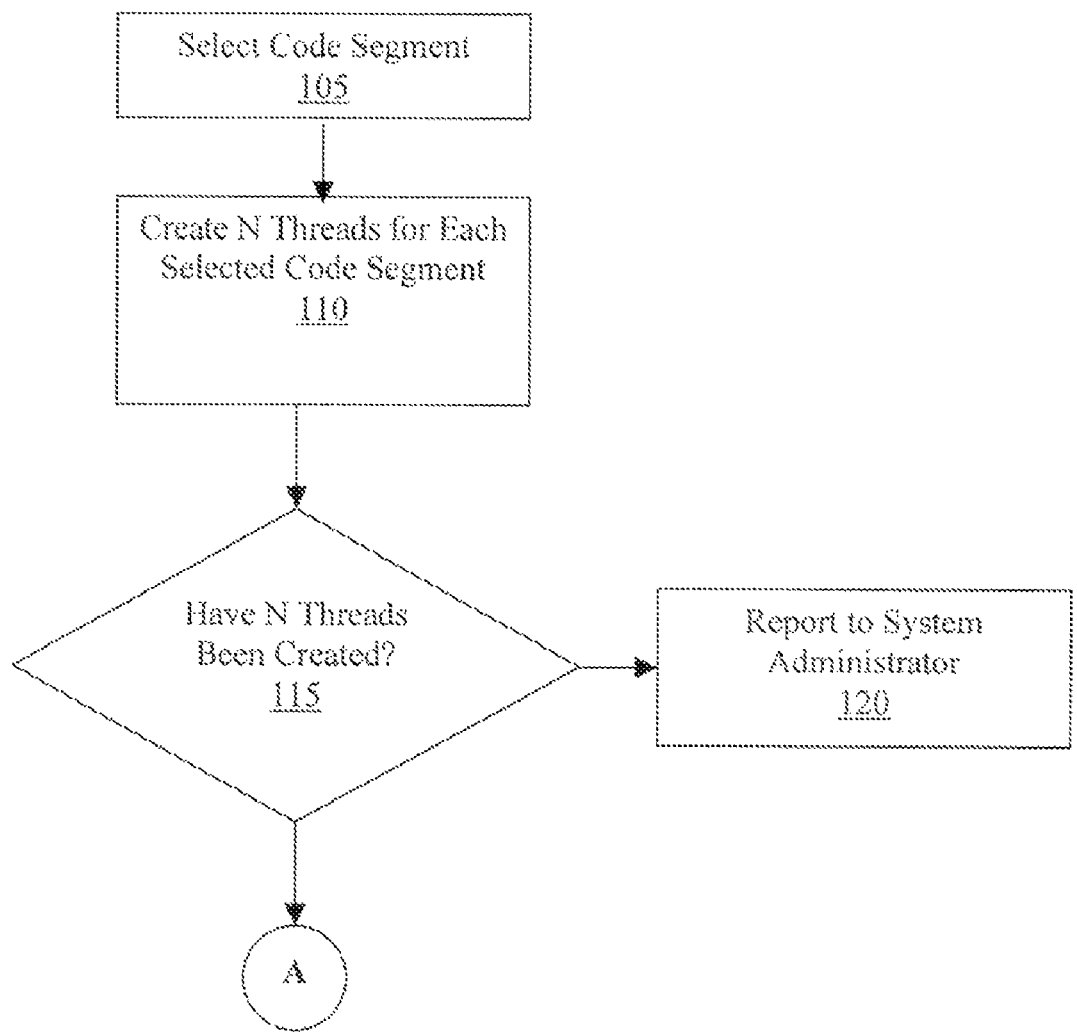
FIGS. 1-3 illustrate an example of a flow diagram detailing of aspects of a parallel thread execution and performance evaluation.
Figure 2:
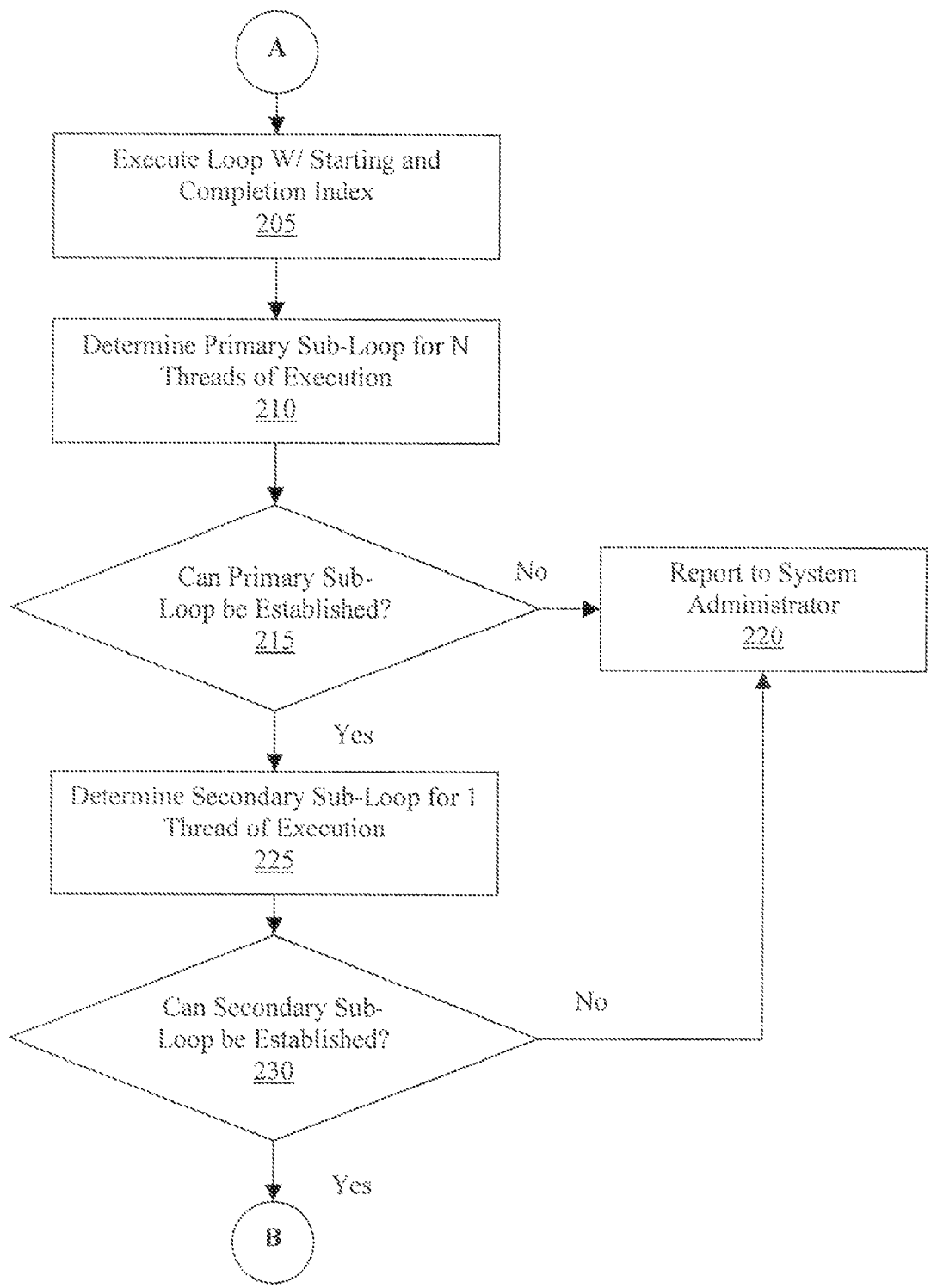
Figure 3:
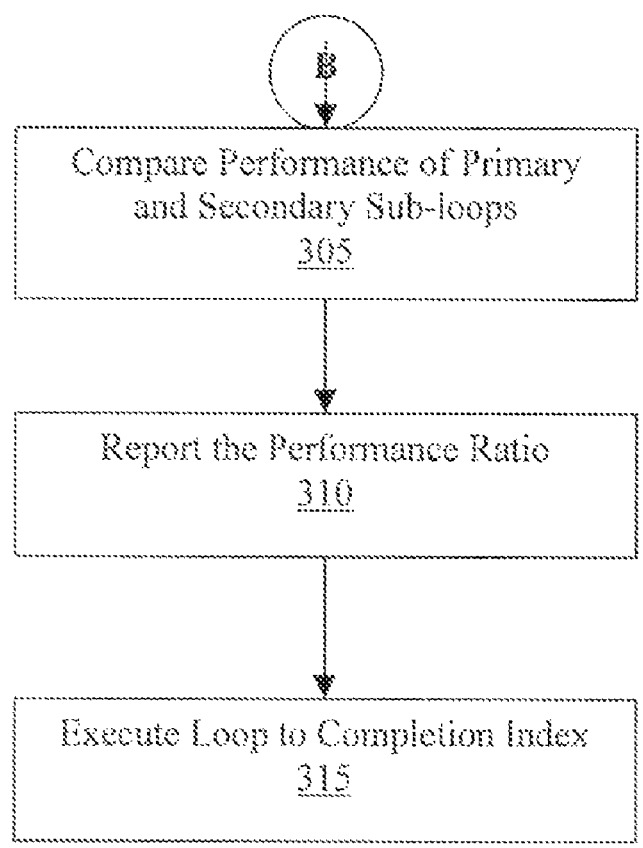

Turning now to the drawings in greater detail, it will be seen that in FIGS. 1-3 there are flow diagrams illustrating aspects of an embodiment of the present invention. As seen at step 105, a code segment instructing the implementation of a parallel enabled operational loop is selected for evaluation. The selected code segment must comprise a loop, wherein the loop has a starting index value A and a completion index value B. FIG. 4 shows an example of such a code segment for a loop using the OpenMP parallel application language. In FIG. 4, the OMP compiler directive (i.e., pragma omp parallel for) instructs the compiler to parallelize a selected loop. If there are eight processors specified with the OpenMP command OMP_NUM_THREADS being set to 8, the loop is partitioned into eight segments and executed in parallel by eight threads. Within aspects of the present invention, a code segment can be specifically selected for evaluation by a computing system application developer or administrator, or randomly selected by a compiler.

Upon the selection of a code segment, at step 110, the compiler generates additional code for the selected code segment comprising N threads, with N being the specified number of execution threads determined at run time from the compiler directive. The number of generated execution threads is examined at step 115. If it is determined that the expected number of N execution threads was not generated, then a warning is generated and transmitted from the compiler to the computing system application developer or administrator (step 120). If the sufficient number of execution threads N has been generated, then at step 205, the loop is executed.

At step 210, a primary sub-loop of the loop with a starting index value of X, and an ending index value of Y (X to Y) is ascertained by using the N threads of execution. The primary sub-loop of the loop is constrained by the following policies: the starting index value X of the primary sub-loop is less than or equal to the ending index value Y; the staring index value X is greater than or equal to the starting index value A of the loop; and the ending index value Y is less than or equal to the completion index value B of the loop. Further, the primary sub-loop must be capable of being executed in a non-zero time period in order to ensure the meaningful performance comparison evaluation of the monitored executed threads. Additionally, any loop iterations that occur prior to the starting index value X of the primary sub-loop must be executed once in order to maintain the integrity of the loop.

At step 215 a determination is made as to whether the primary sub-loop can be established. If it is determined that a primary sub-loop comprising a starting index value X and an ending index value Y cannot be established, then a warning report is generated and transmitted to a system administrator or developer particularly providing notice detailing that the sub-loop cannot be determined (step 220). In the event that a primary sub-loop can be established, then at step 225, it is ascertained if a secondary sub-loop can be established for the one thread of execution. The secondary sub-loop has a starting index value L and an ending index value M (L to M), and is constrained by the following policies: the starting index value L is less than or equal to the ending index value M; the starting index value L is greater than the ending index value Y of the primary sub-loop; and the ending index value M is less than or equal to the completion index value B of the loop. In accordance with the processing of the primary sub-loop, any iterations that are executed prior to the starting index value L, must be executed once in order maintain the integrity of the loop.

At step 230, a determination is made as to whether the secondary sub-loop can be established. If it is determined that a secondary sub-loop comprising a starting index value L and an ending index value M cannot be established, then a warning report is generated and transmitted to a system administrator or developer particularly detailing that the sub-loop cannot be determined (step 220). In the event that a secondary sub-loop can be established, at step 305, the performance metrics of the N execution threads and one execution thread are captured. Thereafter, the performance metrics of the N threads of execution are compared to the metrics of the one thread of execution.

The thread performance characteristics are reported to the system developer or administration (step 310), and thereafter utilized within the system to determine the performance impact of the parallel N execution threads versus the one thread. In the event that it is determined that there is performance degradation of the parallel processing threads N in relation to the one thread of execution, or minimal performance gain in utilizing the N execution threads versus the one execution thread, or the performance period of N is approximately equal to the one execution thread, then the performance information can be captured and presented to the system developer/administrator for further evaluation. Lastly, at step 315, the loop is executed up to the completion index value B.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

The flow diagrams depicted herein are just examples. There may be many variations to these diagrams or the steps (or operations) described herein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed:

1. A method for the examination of the execution and performance of parallel threads in a parallel computing system, the method comprising the steps of:
    acquiring source code of a parallel processing application for compilation within a computing system;
    selecting at least one parallelized code segment from the source code for processing, wherein the parallelized code comprises a loop segment;
    generating additional code for the parallelized code segment, the added code segment comprising N threads and one thread of execution, wherein N represents the number of parallel threads of execution at run time into which the parallelized code segment is partitioned;
    determining if the expected number of N threads of execution have been generated;
    transmitting a warning in the event that the expected number of N threads of execution have not been generated;
    identifying a starting index value and a completion index value of the loop;
    identifying a primary sub-loop of the loop, wherein the primary sub-loop comprises the N threads of execution;
    generating a warning to the computing system operator in the event that the primary sub-loop cannot be identified, and thereafter completing the execution of the loop and the processing of the application;
    identifying a secondary sub-loop for the loop, wherein the secondary sub-loop comprises the one thread of execution;
    generating a warning in the event that the secondary sub-loop cannot be identified and thereafter completing the execution of the loop and the processing of the application;
    completing the remaining iterations of the loop;
    determining the performance metrics of the N threads of execution;
    determining the performance metrics of the one thread of execution;
    comparing the performance metrics of the one thread of execution with that of the N threads of execution;
    reporting the performance ratio of N threads of execution versus the one thread of execution.

2. The method of claim 1, wherein the primary sub-loop comprises a starting index value and an ending index value, wherein the starting index value of the primary sub-loop is less than or equal to the ending index value of the primary sub-loop.

3. The method of claim 2, wherein the starting index value of the primary sub-loop comprises an index value that is greater than or equal to the starting index value of the loop.

4. The method of claim 3, wherein the ending index value of the primary sub-loop is less than or equal to the completion index value of the loop.

5. The method of claim 4, wherein any iteration that exists prior to the starting index value of the primary sub-loop must be executed once.

6. The method of claim 1, wherein the secondary sub-loop comprises a starting index value and an ending index value, wherein the starting index value of the secondary sub-loop is less than or equal to the ending index value of the secondary sub-loop.

7. The method of claim 6, wherein the secondary sub-loop comprises a starting index value and an ending index value, wherein the starting index value of the secondary sub-loop is greater than the primary sub-loop's ending value.

8. The method of claim 7, wherein the ending index value of the secondary starting index value of the secondary sub-loop must be executed once.

9. The method of claim 8, wherein any iteration that exists prior to the starting index value of the secondary sub-loop must be executed once.

10. The method of claim 1, wherein the step of selecting at least one parallelized code segment from the source code for processing requires the at least one parallelized code segment be selected by a computing system developer/administrator or randomly selected by a computer.

11. A computer program product that includes a computer readable medium useable by a processor, the medium having stored thereon a sequence of instructions which, when executed by the processor, causes the processor to examine the execution and performance of parallel threads in a parallel computing system, wherein the computer program product executes the steps of:
    acquiring source code of a parallel processing application for compilation within a computing system;
    selecting at least one parallelized code segment from the source code for processing, wherein the parallelized code comprises a loop segment;
    generating additional code for the parallelized code segment, the added code segment comprising N threads and one thread of execution, wherein N represents the number of parallel threads of execution at run time into which the parallelized code segment is partitioned.
    determining if the expected number of N threads of execution have been generated.
    transmitting a warning in the event that the expected number of N threads of execution have not been generated;
    identifying a starting index value and a completion index value of the loop;
    identifying a primary sub-loop of the loop, wherein the primary sub-loop comprises the N threads of execution;
    generating a warning to the computing system operator in the event that the primary sub-loop cannot be identified, and thereafter completing the execution of the loop and the processing of the application.
    identifying a secondary sub-loop for the loop, wherein the secondary sub-loop comprises the one thread of execution;
    generating a warning in the event that the secondary sub-loop cannot be identified and thereafter completing the execution of the loop and the processing of the application;
    completing the remaining iterations of the loop;

determining the performance metrics of the N threads of execution;

determining the performance metrics of the one thread of execution;

comparing the performance metrics of the one thread of execution with that of the N threads of execution;

reporting the performance ratio of N threads of execution versus the one thread of execution.

12. The computer program product of claim 11, wherein the primary sub-loop comprises a starting index value and an ending index value, wherein the starting index value of the primary sub-loop is less than or equal to the ending index value of the primary sub-loop.

13. The computer program product of claim 12, wherein the starting index value of the primary sub-loop comprises an index value that is greater than or equal to the starting index value of the loop.

14. The computer program product of claim 13, wherein the ending index value of the primary sub-loop is less than or equal to the completion index value of the loop.

15. The computer program product of claim 14, wherein any iteration that exists prior to the starting index value of the primary sub-loop must be executed once.

16. The computer program product of claim 11, wherein the secondary sub-loop comprises a starting index value and an ending index value, wherein the starting index value of the secondary sub-loop is less than or equal to the ending index value of the secondary sub-loop.

17. The computer program product of claim 16, wherein the secondary sub-loop comprises a starting index value and an ending index value, wherein the starting index value of the secondary sub-loop is greater than the primary sub-loop's ending value.

18. The computer program product of claim 17, wherein the ending index value of the secondary sub-loop is less than or equal to the completion index value of the loop.

19. The computer program product of claim 18, wherein any iteration that exists prior to the starting index value of the secondary sub-loop must be executed once.

20. The computer program product of claim 11, wherein the step of selecting at least one parallelized code segment from the source code for processing requires the at least one parallelized code segment be selected by a computing system developer/administrator or randomly selected by a compiler.

* * * * *